United States Patent
Huber et al.

(10) Patent No.: US 10,826,370 B2
(45) Date of Patent: Nov. 3, 2020

(54) METHOD FOR OPERATING A LONG STATOR LINEAR MOTOR WITH SWITCH

(71) Applicant: B&R INDUSTRIAL AUTOMATION GMBH, Eggelsberg (AT)

(72) Inventors: Stefan Huber, Eggelsberg (AT); Dominic Walter, Eggelsberg (AT); Benjamin Reichenwallner, Eggelsberg (AT)

(73) Assignee: B&R Industrial Automation GMBH, Eggelsberg (AT)

( * ) Notice: Subject to any disclaimer, the term of this patent is extended or adjusted under 35 U.S.C. 154(b) by 0 days.

(21) Appl. No.: 16/520,845

(22) Filed: Jul. 24, 2019

(65) Prior Publication Data
US 2020/0036276 A1    Jan. 30, 2020

(30) Foreign Application Priority Data
Jul. 25, 2018 (EP) .................................... 18185539

(51) Int. Cl.
*H02K 41/03* (2006.01)
*H02P 25/06* (2016.01)
(Continued)

(52) U.S. Cl.
CPC .......... *H02K 41/031* (2013.01); *B65G 54/02* (2013.01); *H02P 25/06* (2013.01); *H02P 6/006* (2013.01)

(58) Field of Classification Search
CPC ........ B65G 43/10; B65G 23/23; B65G 43/08; B65G 54/02; B61L 23/34; B61L 23/14;
(Continued)

(56) References Cited

U.S. PATENT DOCUMENTS 5,634,565 A * 6/1997 Lesage ................. B66C 15/045
212/276
8,863,669 B2 * 10/2014 Young ................... B60L 15/005
104/292
(Continued)

FOREIGN PATENT DOCUMENTS

EP    2 280 327    2/2011
EP    2 639 187    9/2013
(Continued)

OTHER PUBLICATIONS

P. Jiménez et al., "Collision Detection Algorithms for Motion Planning Robot Motion Planning and Control", In: "Robot Motion Planning and Control", Springer, XP055546046, Bd. 229, Jan. 1, 1998, pp. 305-343.
(Continued)

*Primary Examiner* — James R Bidwell
(74) *Attorney, Agent, or Firm* — Greenblum & Bernstein, P.L.C.

(57) ABSTRACT

To safely avoid a collision of two transport units in the switch area during operation of a conveyor in the form of a long stator linear motor with a switch, a collision zone is provided in the switch area, wherein the collision zone extends from the beginning of the switch in each case a length on the respective conveyor section, and to define the collision zone, the transport units are considered as two-dimensional objects and a position of the first transport unit on the first conveyor section is determined, which the first transport unit is allowed to occupy, so that the second transport unit can be moved as a two-dimensional object along the second conveyor section without collision through the switch and a distance between this first position and the beginning of the switch is determined and at least this distance is used as the first length.

11 Claims, 5 Drawing Sheets

(51) Int. Cl.
*B65G 54/02* (2006.01)
*H02P 6/00* (2016.01)

(58) Field of Classification Search
CPC .. B61L 25/021; B61L 25/025; B61L 2201/00; B60L 13/00; B60L 13/03; B60L 15/00; B60L 15/05; H02P 6/00; H02P 25/06; H02K 41/025; H02K 41/03; H02K 41/031; Y02P 90/28
See application file for complete search history.

(56) References Cited

U.S. PATENT DOCUMENTS

| | | | |
|---|---|---|---|
| 9,882,520 B2 * | 1/2018 | Huber | H02P 25/064 |
| 10,118,775 B2 * | 11/2018 | Walter | H02K 41/02 |
| 10,220,862 B2 * | 3/2019 | Huber | B61L 23/14 |
| 10,370,195 B2 * | 8/2019 | Huber | G05B 19/4189 |
| 2011/0106341 A1 | 5/2011 | Kinoshita | |
| 2013/0245818 A1 | 9/2013 | Eberle et al. | |
| 2016/0380562 A1 * | 12/2016 | Weber | H02K 41/03 310/12.11 |
| 2017/0217460 A1 | 8/2017 | Huber et al. | |

FOREIGN PATENT DOCUMENTS

| | | |
|---|---|---|
| EP | 3 202 612 | 9/2017 |
| JP | 5-303423 | 11/1993 |

OTHER PUBLICATIONS

Europe Search Report and Office Action conducted in counterpart Europe Appln. No. 18185539.6 (dated Jan. 2, 2019) (w/ machine translation).

* cited by examiner

METHOD FOR OPERATING A LONG STATOR LINEAR MOTOR WITH SWITCH

CROSS-REFERENCE TO RELATED APPLICATIONS

The present application claims priority under 35 U.S.C. § 119(a) of Europe Patent Application No. 18185539.6 filed Jul. 25, 2018, the disclosure of which is expressly incorporated by reference herein in its entirety.

BACKGROUND

1. Field of the Invention

The invention relates to a method for operating a conveyor in the form of a long stator linear motor having a conveyor line with at least one switch, with which a first conveyor section of the conveyor line is connected to a second conveyor section of the conveyor line and the first conveyor section and the second conveyor section diverge in the region of the switch from the beginning of a switch, wherein a first transport unit and a second transport unit are moved along the conveyor line and to avoid collisions between the first transport unit and the second transport unit a collision zone is set in the region of the switch in which there is the risk of a collision between the first transport unit and the second transport unit.

2. Discussion of Background Information

Long stator linear motors are often used as flexible conveyors in manufacturing, machining, assembly, and similar facilities. A long stator linear motor is known to consist essentially of a long stator in the form of a plurality of successively arranged drive coils and a plurality of transport units having excitation magnets (permanent magnets or electromagnets) which are moved along the long stator by the drive coils by applying electric current accordingly in the region of a transport unit. A moving magnetic field is generated by the drive coils, which interacts with the excitation magnets on the transport units to move the transport units. The long stator thus forms a conveyor line, along which the transport units can be moved. This makes it possible to control each transport unit in their movement individually and independently of each other (position, speed, acceleration). For this purpose, each drive coil required for the movement can be controlled by an associated drive coil controller, which can receive instructions for moving a transport unit from a higher-level system control unit (e.g. in the form of setpoint values for position or speed). In this case, it is also possible to provide switches of the long stator linear motor along the conveyor path in order to be able to move a transport unit on different transport sections which are connected by the switch. Often, the long stator is also constructed in the form of conveyor segments, each conveyor segment forming part of the conveyor line and containing a number of drive coils. In most cases, a segment controller is provided for a conveyor segment, which controls all drive coils of the conveyor segment, for example by means of subordinate coil controllers per drive coil. Almost any conveyer lines can also be formed, for example, with straight lines, curves, closed paths, etc. The structural design of the long stator linear motor, so for example the design of the drive coil, the conveyor line, the transport units, the guides of the transport unit, etc., and the control concept can of course be different, but the basic operating principle of a long stator linear motors remains the same.

A conveyor in the form of a long stator linear motor can be quite complex, even with several transport sections that can be interconnected by switches. A large number of transport units can also be moved on it simultaneously. Such a conveyor thus places high demands on the control of the movement of the individual transport units. In particular, precautions must be taken as a rule that individual transport units do not collide with each other during their movement. In the area of switches there are special requirements, because not only a collision must be avoided, but also the order in which transport units may go through the switch must be controlled.

In EP 3 202 612 A1, a predictive check is made for a transport unit as to whether a standstill maneuver with predetermined kinematics can be carried out so that a collision with a preceding transport unit can be prevented and, if not, the standstill maneuver can be initiated. In this case, after the execution of the standstill maneuver, an achieved minimum distance may be required in which a safety margin and also the dimension of the transport unit in the direction of movement can be mapped. In addition, in EP 3 202 612 A1 conflict zones are also placed around a switch into which only one transport unit may ever travel. For this purpose, it is required that a standstill maneuver may end within the conflict zone only for one transport unit. If the respective standstill maneuvers end in the conflict zone for two transport units, only one of them may enter the switch. For a transport unit in front of a switch, a barrier can also be set, which is not traveled over by the transport unit. The barrier can then be removed when the collision risk no longer exists. However, it is assumed in EP 3 202 612 A1 that a switch is associated with a conflict zone, but without stating how to get to the conflict zone.

SUMMARY

Embodiments of the subject invention provide a method with which a collision zone can be set in the region of a switch during operation of a conveyor in the form of a long stator linear motor, so that a collision of two transport units in the switch area can be safely avoided.

In embodiments, a determination of the collision zone in the region of the switch can ensure that a transport unit can be stopped on a conveyor section in front of the collision zone and another transport unit on the other conveyor section can safely travel through the switch without causing a collision between the two transport units. The two-dimensional consideration of the transport units also takes into account a deflection of a transport unit on a curved section of the conveyor path in the region of the switch, which otherwise could lead to an undesired collision of the transport units. For this purpose, any arbitration logic can be implemented which controls the access of the transport units into the switch. If a transport unit enters the switch, another transport unit may be stopped in front of the collision zone for as long as there is a risk of a collision in the collision zone. In principle, any suitable strategy can also be implemented with the determination of the collision zone according to the invention for the detection of a collision risk in the collision zone.

The second length of the collision zone can be determined by determining a second position of the second transport unit as a two-dimensional object on the second conveyor section, which the second transport unit may occupy, so that the first transport unit can be moved as a two-dimensional object (possibly taking into account the transported part and/or a parts carrier) without collision through the switch along the first conveyor section and that a distance is determined as a second length between this second position and the beginning of the switch. In a simpler embodiment, the second length is set equal to the first length.

In order to simplify the determination of the lengths of the collision zone, a two-dimensional geometric shape can be selected as the two-dimensional object for the first transport unit, which surrounds the contour of the first transport unit and/or a two-dimensional geometric shape is selected as a two-dimensional object for the second transport unit which surrounds the contour of the second transport unit. With such defined, preferably simple, geometric shapes, such as rectangles, overlaps of the two transport units can be determined more easily and quickly.

For optimization of the switch travel, different collision zones can be defined for different combinations of different first and second transport units for a switch. In this way, the collision zone can be optimally adapted to the respective transport units that want to travel through the switch. In the same way, different collision zones can be defined for different switches.

With a fixed collision zone, travel through the switch can be easily controlled by allowing a second transport unit on the second conveyor section access to the collision zone in which the first transport unit is located, if a collision-free movement of the second transport unit into the collision zone is possible or a first transport unit on the first conveyor section is allowed access to the collision zone in which the second transport unit is located, if a collision-free movement of the first transport unit into the collision zone is possible. Thus, a transport unit outside the collision zone can be stopped until it is ensured that no collision can occur when entering the switch. For this purpose, the preceding transport unit must not necessarily have already left the switch, but both transport units can be moved simultaneously through the switch one after the other. In order to realize this, preferably, a minimum distance between the first transport unit and the second transport unit is set, which must be complied with, so that the first transport unit and the second transport unit can be moved through the switch without collision, wherein, to check for compliance with the minimum distance, the first transport unit on the first conveyor section in the collision zone is projected onto the second conveyor section in the collision zone, and/or vice versa. By projection, a simple check of a minimum distance is sufficient because the transport units appear on the same conveyor section. For collision monitoring, it no longer has to be distinguished whether the two transport units in the area of the switch are traveling on the same conveyor section or on different conveyor sections.

Other exemplary embodiments and advantages of the present invention may be ascertained by reviewing the present disclosure and the accompanying drawing.

BRIEF DESCRIPTION OF THE DRAWINGS

In the following, the present invention is described in greater detail with reference to FIGS. 1 to 6 which, by way of example, show schematic and non-limiting advantageous embodiments of the invention. In the drawings

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
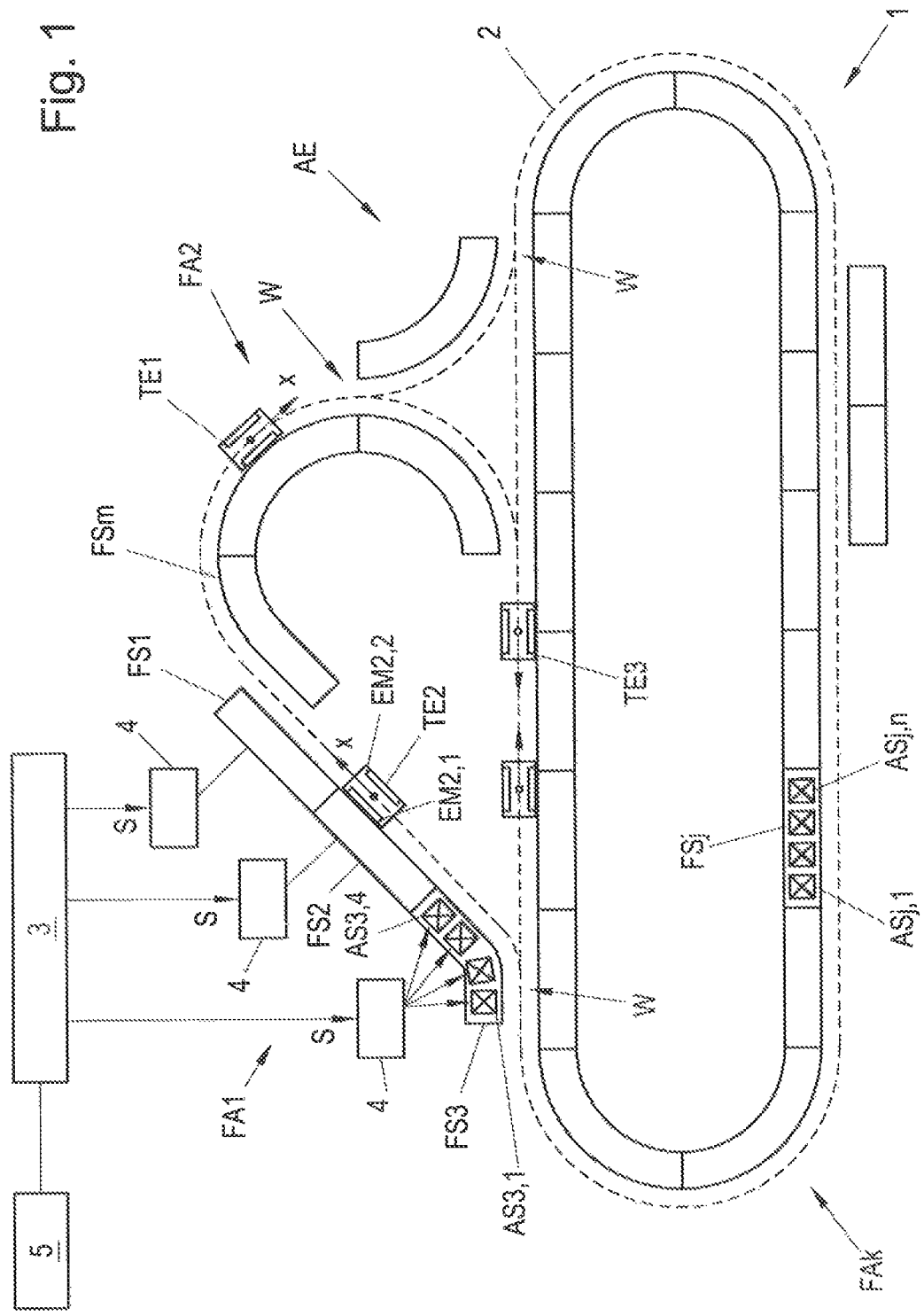
FIG. 1 shows an embodiment of a conveyor in the form of a long stator linear motor.

FIG. 1 shows an example of any structure of a conveyor 1 with a conveyor line 2 (indicated by the dashed line). The conveyor 1 is designed as a long stator linear motor and a plurality of transport units $TE_i$, $i \in N$ are provided, which can be moved along the conveyor line 2. The conveyor line 2 is essentially defined by the stationary long stator of the long stator linear motor 1. In the exemplary embodiment shown, a number of conveyor segments $FS_j$, $j \in N$ are provided, which define the path of the transport units $TE_i$, that is to say the conveyor line 2. Individual conveyor sections $FA_k$, $k \in N$ of the conveyor line 2 can be formed by a number of juxtaposed conveyor segments $FS_j$. The conveyor segments $FS_j$, and thus also the conveyor sections $FA_k$, thereby form part of the long stator of the long stator linear motor. The conveyor segments $FS_j$, or generally the conveyor sections $FA_k$, are fixedly arranged on a suitable construction and as a rule also form guide elements along which the transport unit $TE_i$ can be guided and held. Each conveyor section $FA_k$ comprises at least one conveyor segment $FS_j$, normally several conveyor segments $FS_j$. Individual conveyor sections $FA_k$, or conveyor segments $FS_j$ of individual conveyor sections $FA_k$ (such as the conveyor segments $FS1$, $FSm$), may also partially overlap along the conveyor line 2 in the conveying direction x on different sides of the transport unit $TE_i$, especially at locations of the conveyor line 2 at which a transition from a conveyor section $FA_k$ on one side to another conveyor section $FA_k$ on the other side (such as from the conveyor section $FA1$ on the conveyor section $FA2$) takes place. It can also be provided that conveyor segments $FS_j$ are arranged in sections on both sides of the conveyor line 2. Switches W may also be provided, on which (depending on the conveying direction of a transport unit $TE_i$) two conveyor sections $FA_k$ are brought together or a division into two conveyor sections $FA_k$ takes place. It is understandable that a conveyor line 2 of almost any design can thus be formed, which also need not only be in a two-dimensional plane, but can also extend in three dimensions.

Each conveyor segment $FS_j$ comprises a number n of drive coils $AS_{j,n}$, $j \in N$, $n \in N$ arranged next to one another in the conveying direction x, wherein the number n does not have to be the same for each conveyor segment $FS_j$. In FIG. 1, for the sake of clarity, only drive coils $AS_{j,n}$ of some conveyor segments $FS_j$ are shown. Each transport unit $TE_i$ comprises a number m of excitation magnets $EM_{i,m}$, $i \in N$, m∈N (permanent magnets or electromagnets), preferably on both sides (relative to the conveying direction x, which is indicated by the arrows on the transport units TEi). The drive coils ASj,n generate a moving magnetic field and interact in the operation of the conveyor 1 in a known manner according to the motor principle with the excitation magnet EMi,m of the transport units TEi in the field of drive coils ASj,n. If the drive coils ASj,n are energized in the region of a transport unit TEi by applying a coil voltage with a coil current, a magnetic flux is produced which, in cooperation with the excitation magnets EMi,m causes a force on the transport unit TEi. Depending on the coil current, this force can be known to comprise a propulsion force-forming and/or a lateral force-forming force component. The propulsion force-forming force component essentially serves for the movement of the transport unit TEi in the conveying direction x and the lateral force-forming force component can be used to guide the transport unit TEi, but also to fix the path of the transport unit TEi in a switch W. In this way, each transport unit TEi can be moved individually and independently along the conveying path 2 by supplying the drive coils ASj,n in the region of each transport unit TEi with a corresponding coil current in accordance with the movement to be carried out.

Along the conveyor line 2 a switch W may also be provided, where a transport unit TEi can be moved on different conveyor sections FAk, FAk+1, or two transport units TEi, TEi+1 being moved on different conveyor sections FAk, FAk+1 are merged in the switch W onto a conveyor section.

This basic operation of a long stator linear motor is well known, so it will not be discussed further. For the subject invention, it is also irrelevant how the transport units TEi, the conveyor sections FAk, the conveyor segments FSj, the drive coils ASj,n, the excitation magnets EMi,m, etc. are structurally and specifically designed and shaped, which is why this will not be discussed in detail.

In order to control the movement of the individual transport units TEi, a transport unit control 3 (hardware and/or software) is provided in which the setpoint values S for the movement of the transport units TEi are generated or determined. Of course, it is equally possible to provide a plurality of transport unit controls 3, which are each assigned to a part of the conveyor 1, e.g. a conveyor section FAk, and which control the movement of the transport units TEi on this part. In addition, segment control units 4 (hardware and/or software) can be provided, which are assigned to a conveyor segment FSj (or to several conveyor segments FSj or also to a part of a conveyor segment FSj) and which convert the setpoint specifications of the associated transport unit control 3 for a transport unit TEi into coil currents for the associated drive coils ASj,n, so into concrete manipulated variables such as coil voltages. However, the segment control units 4 could also be implemented or integrated in a transport unit control 3. The manipulated variables can then be used in a power electronics, not shown, to generate an electrical variable, such as current or voltage, and apply it to the drive coils ASj,n. For example, positions p of the transport units TEi along the conveyor line 2, or equivalently also speeds v, can be specified as desired values S. This means that a new setpoint S is calculated or predetermined for each transport unit TEi in each timing step of the control and which is adjusted by the segment control units 4. Accordingly, a suitable controller is implemented in a segment control unit 4, which converts the setpoint specification into a suitable manipulated variable, for example into a driving force or a coil current, from which, in turn, coil voltages for the individual drive coils ASj,n are determined.

The desired movement of the transport units TEi along the conveyor line 2 can also be predetermined by a conveyor control 5 (hardware and/or software), in which, for example, a route calculation (e.g. which way should a transport unit TEi take?), a switch arbitration (e.g. which transport unit TEi may enter a switch?), deadlock avoidance (e.g. are two transport units TEi blocking each other?), etc., can take place to move the transport units TEi in a desired manner along the conveyor line 2, for example, to realize a manufacturing, assembly, or other process. This movement specification for the transport units TEi is implemented in the transport unit control 3 in setpoint specifications for the transport units TEi. For this purpose, a movement profile can be specified for a transport control unit 3, for example a path-time profile, or a target position or a target speed, from which a movement profile is then calculated.

As such, it should be ensured in the conveyor control 5 or the transport unit control 3 that no inadmissible states occur on the conveyor line 2. This primarily comprises the avoidance of a collision of two transport units TEi on the conveyor line 2. In order to avoid a collision, in particular a certain minimum distance M is to be maintained between two transport units TEi, TEi+1 traveling in succession. The minimum distance M can be easily configured and can also include a certain additional safety distance, for example to map unavoidable control errors. In the area of a switch W, however, this consideration is only sufficient if the two transport units TEi, TEi+1 traveling in succession are moved on the same conveyor section FAk. If two transport units TEi, TEi+1 in the region of a switch W move on different conveyor sections FAk, FAk+1, it no longer depends solely on a distance between the two consecutive transport units TEi, TEi+1 with respect to collision avoidance, as is explained below using FIG. 2.

Figure 2:
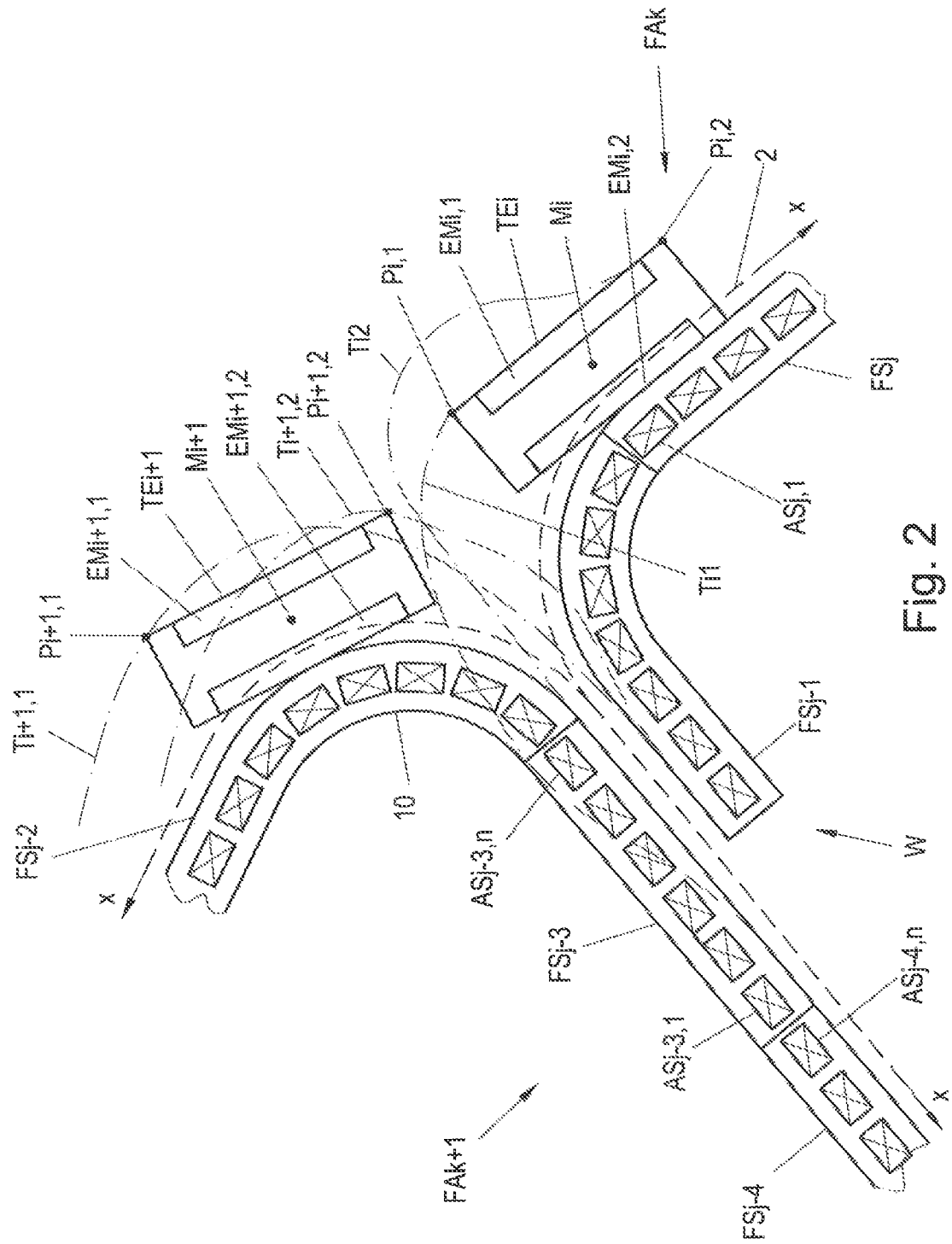
FIG. 2 shows a section of the conveyor line of the conveyor having a switch and two transport units.

FIG. 2 shows a switch W of a conveyor path 2 of a conveyor 1 in the form of a long stator linear motor. Shown are any conveyor sections FAk, FAk+1, which are connected to each other via a switch W. In the region of the switch W, at least in sections, two conveyor sections FAk, FAk+1, are arranged next to one another in the conveying direction x. In the illustrated embodiment, the conveyor section FAk ends in the region of the switch W, which of course does not have to be the case. At the switch W, a transport unit traveling on a conveyor section FAk+1 in the direction of the switch W can either be moved further on the first conveyor section FAk or moved further on the second conveyor section FAk+1—this is also referred to as divergent switch travel. But, at the switch W, two transport units TEi, TEi+1 can be moved, on different conveyor sections FAk, FAk+1 in the direction of the switch W (as shown in FIG. 2), both on the first conveyor section FAk (or on the second conveyor section FAk+1 or on different conveyor sections FAk, FAk+1, if the second conveyor section FAk+1 extends beyond the region of the switch W)—this is also referred to as converging switch travel.

Each conveyor section FAk, FAk+1 can again be composed of conveyor segments FSj. At each conveyor segment FSj, or in general, along the conveyor sections FAk, FAk+1, drive coils ASj,n are arranged one after the other as described. The conveyor segments FSj, or generally the conveyor sections FAk, FAk+1, are arranged stationary.

Figure 3:
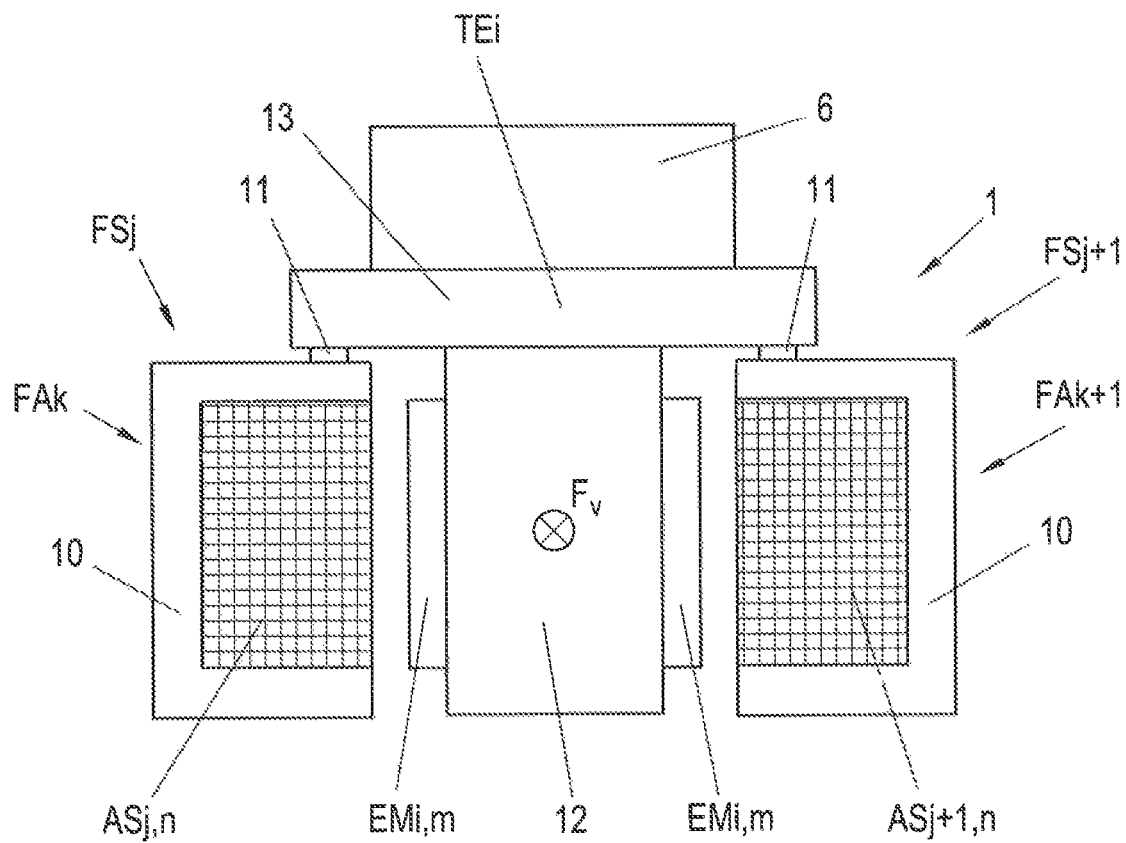
FIG. 3 shows a cross-section through the conveyor line and a transport unit.

It is obvious that a transport unit TEi seen in the conveying direction x must have excitation magnets EMi,m on both sides in order to be able to be moved in the switch region B along the desired conveyor section FAk, FAk+1. A transport unit TEi is embodied, for example, as shown in FIG. 3. FIG. 3 shows a cross-section through an arbitrary part of the conveyor line 2 with conveyor sections FAk, FAk+1 on both sides and a transport unit TEi moving thereon. In the exemplary embodiment shown, a transport unit TEi consists of a base body 12 and a component receptacle 13 arranged thereon for receiving a part 6 to be transported, wherein the component receptacle 13 and the part 6 can in principle be arranged at an arbitrary position of the main body 12, in particular also on the underside for hanging parts 6. The number of excitation magnets EMi,m is arranged on the base body 12, preferably on both sides of the transport unit TEi. The conveyor line 2 of the conveyor 1, or of a conveyor section FAk, FAk+1, is formed by a stationary guide construction 10, on which the drive coils ASj,n, ASj+1,n are arranged. The base body 12 with the excitation magnets EMi,m (e.g. permanent magnets) arranged on both sides is arranged between the drive coils ASj,n, ASj+1,n in the exemplary embodiment shown. Thus, in each case at least one excitation magnet EMi,m a drive coil ASj,n, ASj+1,n (or a group of drive coils) is arranged opposite each other and thus acts with at least one drive coil ASj,n, ASj+,n to generate a driving force $F_v$ together. Thus, the transport unit TEi is movable between the guide structure 10 with the drive coils ASj,n, ASj+1,n and along the conveyor path 2. Of course, other arrangements of the drive coils ASj,n, ASj+1,n and the interacting excitation magnet EMi,m are conceivable. For example, it is also possible to arrange the drive coils ASj,n, ASj+1,n inside and the excitation magnets EMi,m inwardly and to arrange the drive coils ASj,n, ASj+1,n to encompass each other. Likewise, drive coils ASj,n, ASj+1,n may be provided on a guide structure 10 on a conveyor section FAk, FAk+1 also only on one side (viewed in the conveying direction x).

Naturally, guide elements 11, such as rollers, wheels, sliding surfaces, magnets, etc. (not shown here for reasons of clarity or only implied) can also be provided on the base body 12 and/or on the component receptacle 13 in order to guide the transport unit Tn along the transport route 2. The guide elements 11 of the transport unit TE1 act together to guide with the stationary guide structure 10, for example, in which the guide elements 11 are supported on the guide structure 10, slide off it or roll off it, etc. But the guiding of the transport unit TEi, in addition to mechanical guides also (alternatively or additionally), can also be done by the provision of guide magnets.

When a transport unit TEi is moved along a curved portion of the conveyor line 2, the inherently rigid transport unit TEi will deflect due to the guide at the curved portion. An arbitrary point Pi,q, q∈N on the transport unit TEi thus follows, when the transport unit TEi moves along the conveying path 2, a trajectory Ti,q which is essentially dependent on the dimensions of the transport unit TEi and the curvature. Of course, different points Pi,q at the transport unit TEi can produce different trajectories Ti,q. In a switch W there is always at least one curved section.

In FIG. 2, for each transport unit TEi, TEi+1 there are two points Pi,1, Pi,2, Pi+1,1, Pi+1,2 and their trajectories Ti,1, Ti,2, Ti+1,1, Ti+1,2 when traveling along the curved sections in the switch W shown. Points Pi,q, which produce trajectories Ti,1, Ti,2, Ti+1,1, Ti+1,2, which maximize the conflict zone K, that is to say the lengths L1, L2, are of course interesting, for example those trajectories Ti,1, Ti,2, Ti+1,1, Ti+1,2, which first intersect another transport unit TEi, TEi+1. In FIG. 2, for example, each of the trajectories of a front and rear corner point of the transport units TEi, TEi+1 lying opposite the conveyor section FAk, FAk+1 are shown, for example. Which point Pi,q results in an interesting trajectory depends, of course, on the shape of the transport unit TEi. In this case, under certain circumstances, the part 6 conveyed with a transport unit TEi, possibly with parts carrier, is to be taken into account. If the part 6 or a parts carrier projects beyond the transport unit TEi, then the part 6 or the parts carrier can also generate a maximally spaced trajectory Ti,q. A point Pi,q of a transport unit TEi or a trajectory Ti,q of a transport unit TEi is thus also understood to mean a point or a trajectory of the part 6 arranged on the transport unit TEi or of a parts carrier. A collision of two transport units TEi, TEi+1 in the region of a switch W is thus possible when a first transport unit TEi intersects a trajectory Ti+1,1, Ti+1,2 of a second transport unit TEi+1, or vice-versa. It does not matter whether there is a diverging or converging switch.

Thus, in the region of a switch W, a collision zone K (FIG. 4) can be defined, within which a collision of two transport units TEi, TEi+1 can occur in the region of a switch W. The collision zone K extends from the beginning B of the switch W of the divergent part of the switch W (which is defined by the geometry of the conveyor line 2), i.e. where the two conveyor sections FAk, FAk+1 begin to diverge, on each conveyor section FAk, FAk+1 of the switch W a length L1, L2 to be determined in each case to one end E1, E2 on the conveyor sections FAk, FAk+1.

In order to define the collision zone K, the lengths L1, L2 or the ends E1, E2 are to be determined. Thereby the lengths L1, L2 must be at least so great that when a first transport unit TEi, TEi+1 on a first conveyor section FAk is in front of the collision zone K, a second transport unit TEi+1 on the second conveyor section FAk+1 of switch W can travel through the switch W, without touching the first transport unit TEi. For this purpose, the transport units TEi, TEi+1 are considered to be at least two-dimensional objects, that is to say in particular with a length and a width.

In order to determine the lengths L1, L2 and thus the ends E1, E2 of the collision zone K, for example, the maximum trajectories Ti,1, Ti,2, Ti+1,1, Ti+1,2 of the transport units TEi, TEi+1 can be determined and checked in the area of the switch W, where there is an overlap of a trajectory Ti,1, Ti,2, Ti+1,1, Ti+1,2 with a transport unit TEi, TEi+1 as a two-dimensional object. The position at which there is no overlap for the first time can then be defined as end E1, E2. For the length L1, for example, a check is made as to where there is no overlap of the second transport unit TEi+1 on the second conveyor section FAk+1 with a trajectory Ti,1, Ti,2 of the first transport unit TEi on the first conveyor section FAk. This can of course lead to several overlaps and thus to several intersections. The distance (possibly as arc length) of this position to the beginning B of the switch W then results in the minimum first length L1, which must be maintained in order to move the second transport unit TEi+1 collision-free along the second conveyor section FAk+1 through the switch W. The length L1 can also be made larger for safety reasons, which of course shifts the position of the end E1. If appropriate, the procedure for the length L2 may be analogous.

However, it is also possible to simulate the movements of the two transport units TEi, TEi+1 as two-dimensional objects through the switch W and to check thereby whether and where the two transport units TEi, TEi+1 intersect, from which again the lengths L1, L2 can be determined.

For the determination of the length L1 on the conveyor section FAk in the area of the switch W, one could also proceed in a kind of binary search. In this case, a transport unit TEi is placed as a two-dimensional object on the conveyor section FAk at a test distance from the beginning B of the switch W and a check is performed as to whether the thus placed transport unit TEi from a transport unit TEi+1 overlaps on the other conveyor section FAk+1 as a two-dimensional object or of a trajectory Ti+1,q of a transport unit TEi+1 on the other conveyor section FAk+1 when moving through the switch W. Of course this can be simulated by calculation. The test distance at which there is no overlap can then be used as the minimum length 1,1. If appropriate, the procedure for the length L2 may be analogous.

It is obvious that when determining the lengths L1, L2, it is not absolutely necessary to take into account the entire two-dimensional object. As a rule, it will be sufficient to consider, for example, only the two mutually facing sides of the two-dimensional objects of the transport units TEi, TEi+1, because in the region of the switch W, in this region, contact between the transport units TEi, TEi+1 can arise. For example, in the case of rectangles as two-dimensional objects, one could only consider the two mutually facing sides oriented in the conveying direction x. This could also simplify the determination of the lengths L1, L2. It should be noted, however, that the transport units TEi, TEi+1 are nevertheless modeled as two-dimensional objects, although ultimately only two lines are considered.

It should be noted that the beginning B and the lengths L1, L2, or the ends E1, E2, are always related to a fixed reference point Mi, Mi+1 of the transport units TEi, TEi+. The reference point Mi, Mi+1 is preferably a center of the transport units TEi, TEi+1. However, the reference point Mi, Mi+1 can in principle also be chosen differently, for example a front or rear point relative to the conveying direction x at the transport unit TEi, TEi+1.

For determining the lengths L1, L2, a transport unit TEi is considered to be at least a two-dimensional object, which is determined, for example, by the contour of the transport unit TEi. In order to simplify the search for the lengths L1, L2, a certain simple geometric two-dimensional shape, for example a rectangle or a convex hull, can also be placed around the transport unit TEi, TEi+1, that is to say completely surrounds the contour of the respective transport unit TEi, TEi+1, and then the trajectories Ti,q determined and/or intersections are sought with this simple form as a two-dimensional object. Again, it may be necessary for the two-dimensional object to consider a part 6 which is conveyed by the transport unit TEi, in particular if the part 6 projects beyond the transport unit TEi. In this case, the part 6 is considered to be part of the transport unit TEi to be surrounded by the two-dimensional object.

If transport units TEi, TEi+1 with different geometries or contours or even parts 6 (parts carriers) are moved along the conveying path 2, different collision zones K can also be defined for various possible combinations of transport units TEi, TEi+1 in the region of a switch W. However, for the sake of simplicity, the resulting largest collision zone K can also be used for all transport units TEi, TEi+1.

Figure 4:
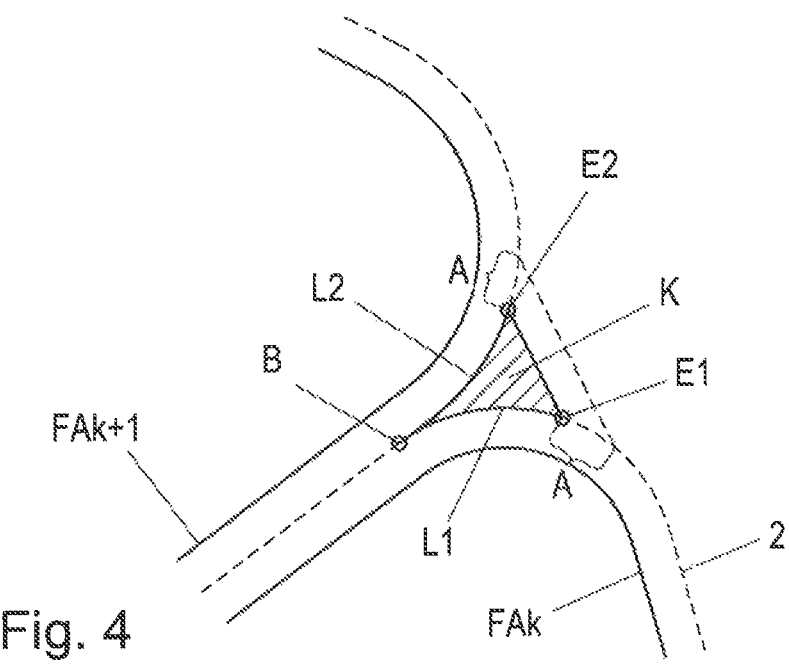
FIG. 4 shows a collision zone of a switch.

A certain length L1, L2 can also be extended by a certain safety distance A (which can also be different), as indicated in FIG. 4, for example in order to take into account possible control errors (tracking errors).

The lengths L1, L2 may or may not be the same. In an advantageous embodiment, however, the lengths L1, L2 are chosen the same. If the lengths L1, L2 determined as described above are different, the maximum value of the determined lengths can be used, for example, for both lengths L, L2.

Figure 5:
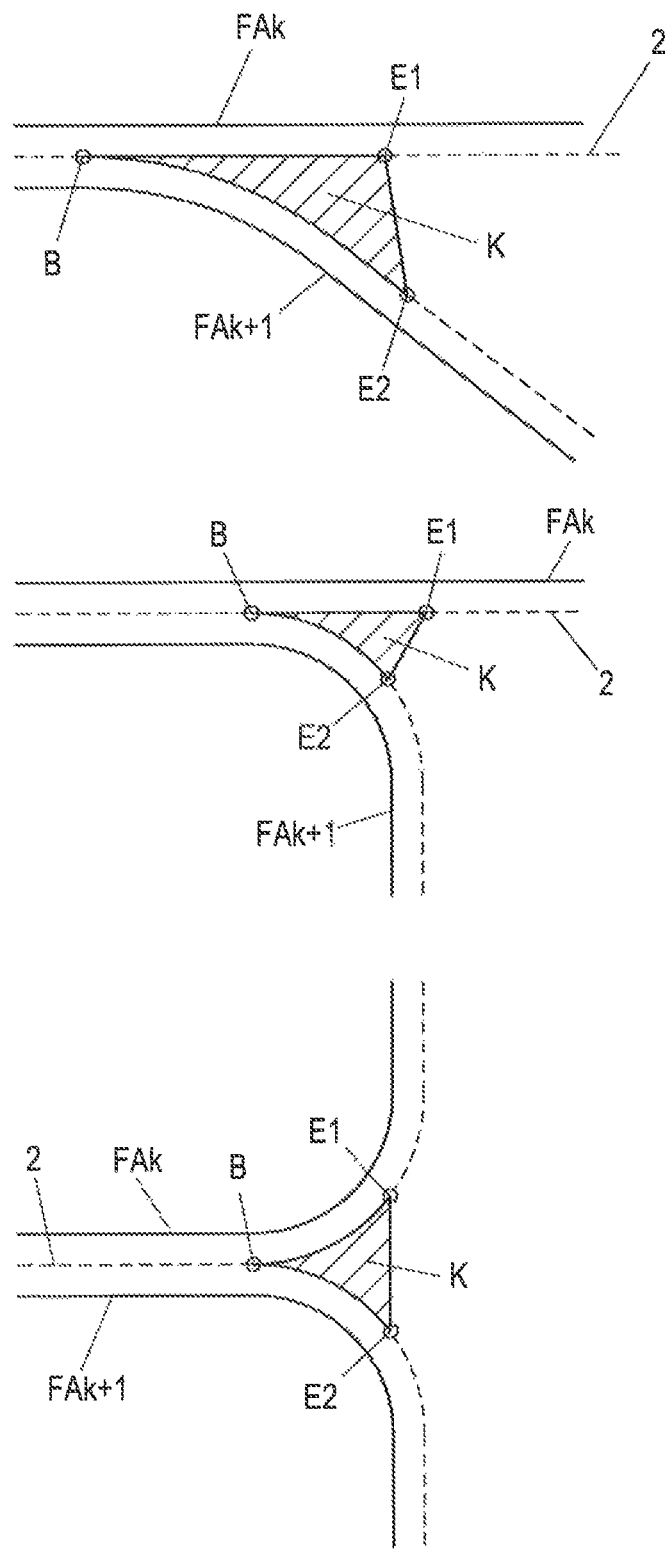
FIG. 5 shows different collision zones for different switch geometries.

Of course, the lengths L1, L2 are dependent not only on the dimensions (e.g. length and width) of the transport units TEi, TEi+1, but also on the geometry of the conveyor line 2, in particular the curvature of the conveyor line 2, in the region of the switch W. As a rule, different lengths L1, L2 will also result for different switch geometries, as shown in FIG. 5 with reference to a 45°, 90° and 180° switch. Therefore, the lengths L1, L2 are preferably determined for each switch W with different geometry. In a simple embodiment, a maximum collision zone K can also be determined, which is then used for each switch W.

It is sufficient, however, to determine the collision zones K of the various switches W, and optionally also for the different geometries of the transport units TEi, TEi+1, only once, as a rule before the start of the operation of the conveyor 1, because then during operation nothing changes. If, however, transport units TEi, TEi+1 with other geometries are added during operation or other parts 6 are conveyed, it may be necessary to redetermine the collision zones K, at least partially. The same applies if the conveyor 1 is changed and switches W are added.

For collision monitoring, it is therefore possible to check with a collision monitoring unit (hardware and/or software) whether two transport units TEi, TEi+1 want to enter a switch W simultaneously in converging switch travel. The collision monitoring unit can also be implemented or integrated in the transport unit control 3 or the conveyor control 5, for example. If this is detected, one of the two transport units TEi, TEi+1 is stopped in front of the collision zone K according to a defined arbitration logic, i.e. at the respective end E1, E2 of the collision zone K, and then one waits until the other transport unit TEi, TEi+1 has driven through the switch W or until the transport unit is moved sufficiently far into the switch W, so that no more collision can occur.

This can be implemented particularly advantageously by setting a minimum distance M which is to be maintained between two transport units TEi, TEi+1 driving in succession. The minimum distance M is in turn related to a reference point Mi, Mi+1, preferably again the center of the transport units TEi, TEi+1, and results, for example, at least from the sum of the two half lengths of the transport units TEi, TEi+1, usually plus a certain safety distance. If a transport unit TEi extends forwardly and backwardly with different extents relative to the conveying direction x, the actual extent in the conveying direction x (forwardly) or contrary to the conveying direction x (backwardly) must of course be used to determine the minimum distance M.

Figure 6:
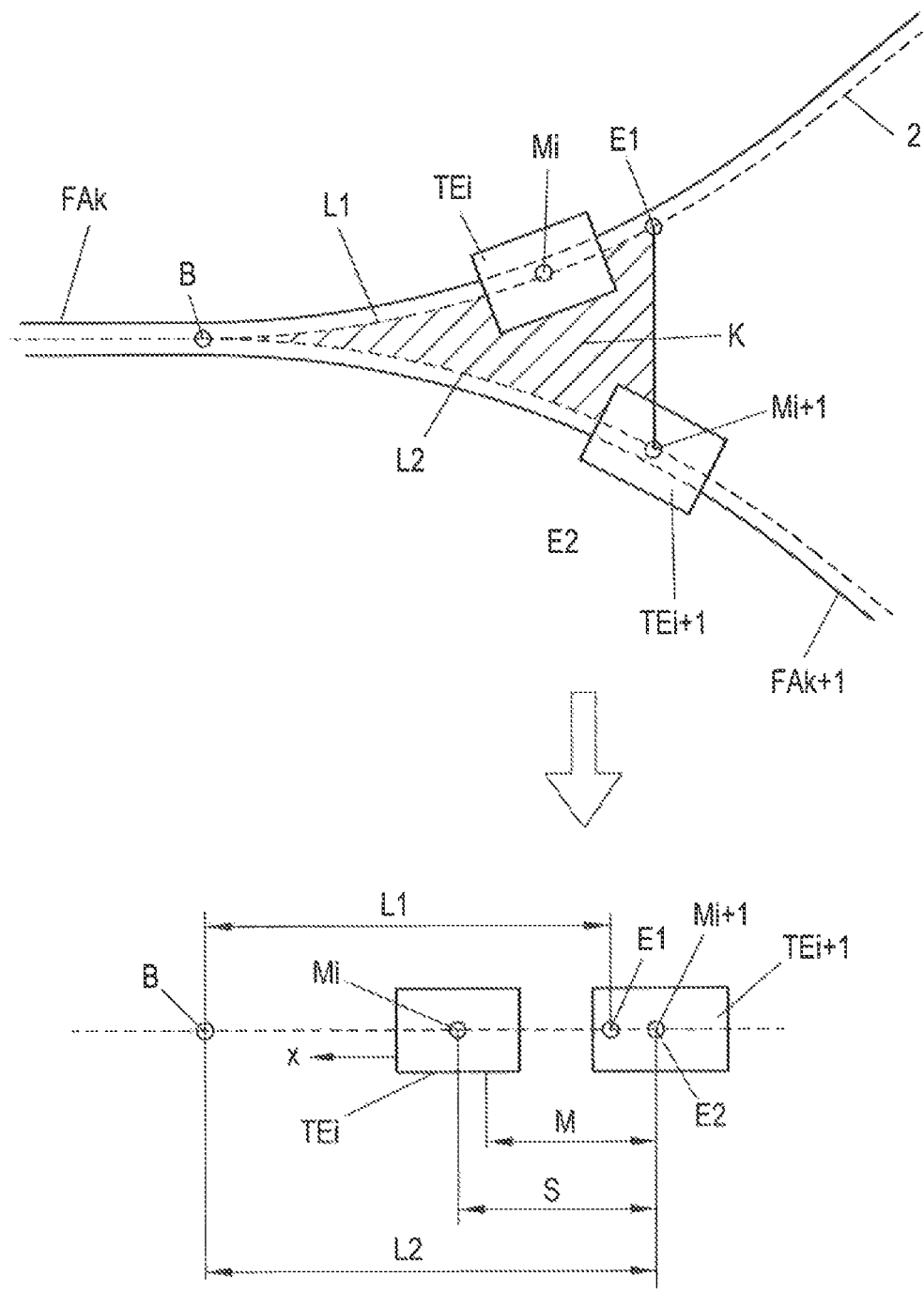
FIG. 6 shows a transport unit being projected onto another conveyor section in a collision zone of a switch.

If the two transport units TEi, TEi+1 are moved in the region of a switch W on different conveyor sections FAk, FAk+1, as shown in FIG. 6, then a transport unit TEi on a conveyor section FAk which is within the associated collision zone K, is projected onto the other conveyor section FAk+1 in the region of the switch W, as shown in FIG. 6 below. For example, the distance of a transport unit TEi on the conveyor section FAk to the beginning 13 of the switch W can be used for the projection and this transport unit TEi can be projected onto the other conveyor section FAk+1 with the same distance to the beginning 13 of the switch W. A transport unit TEi+1 on the other conveyor section FAk+1 will thus only enter the switch W when the minimum distance M between the projected transport unit TEi and the transport unit TEi+1 is given. The transport unit TEi+1 can be stopped at the end E2 of the collision zone K at the conveyor section FAk+1 until the minimum distance M is reached. In addition, compliance with the minimum distance M in the area of the switch can then be checked, wherein it must be true that the actual distance S between the two transport units TEi, TEi+1 or a projected transport unit TEi and the other transport unit TEi+1 is greater than the minimum distance M. Where appropriate, the distances are understood as arc length.

This also applies analogously to a divergent switch travel, wherein a transport unit TEi+1 is then optionally stopped at the beginning B of the collision zone K until the provided minimum distance M is set in a projection.

By providing a collision zone K and/or by also checking a minimum distance M in the region of a switch W, a plurality of transport units TEi, TEi+1 in the region of a switch W can be moved simultaneously. Thus, it is not necessary to wait until a first transport unit TEi has passed completely through a switch W or the collision zone K until a second transport unit TEi+1 is allowed to enter the switch W or the collision zone K of the switch W. In this way, the possible conveying throughput of transport units TEi, TEi+1 of the conveyor 1 can be increased.

The minimum distance M between two consecutively moving transport units TEi in the region of a switch W can be easily determined, or can also be determined from the geometry of the switch W and the conveyor sections FAk, FAk+1 in the region of the switch W. A transport unit TEi on a curved section of the conveyor line 2 will deflect, as a result of which the distance to a transport unit TEi+1 traveling behind it (or else ahead of it) may change. Of course, the deflection depends on the dimension of the transport unit TEi and also on the geometry of the curved section (in particular the curvature).

If two transport units TEi, TEi+1 are traveling in succession travel in a switch W on the same conveyor section FAk, it is thus possible to use the geometry of the transport units TEi, TEi+1 and the respective curvature of the conveyor section FAk at the location of the transport units TEi, TEi+1 to determine the deflections (for example, mathematically or by simulation), from which in turn a first minimum distance M1 can be derived, which must be complied with, so that the two transport units TEi, TEi+1 do not touch. On a straight section, of course, this results in a theoretical first minimum distance M1 at which the two transport units TEi, TEi+1 travel directly behind one another because there is no deflection.

When two transport units TEi, TEi+1 in the area of the switch W are moved on different conveyor sections FAk, FAk+1, at least one transport unit TEi, TEi+1 may again deflect due to the movement on a curved section. This deflection may cause the distance between the two transport units TEi, TEi+1 to change. This state also depends on the geometry of the switch W itself, i.e. on the geometry of the two conveyor sections FAk, FAk+1 in the region of the switch W. For example, a switch W with a straight conveyor section FAk and a curved conveyor section FAk+1 will have different minimum distance requirements M2 than a switch with two curved conveyor sections FAk, FAk+1. Also, this second minimum distance M2 determined by the geometry of the switch can be determined by calculation or by simulation.

For collision avoidance in the region of the switch W, the larger of the two minimum distances M1, M2 can then be used as minimum distance M for a specific combination of transport units TEi, TEi+1. Alternatively, one could also distinguish the two cases and use the respectively appropriate minimum distance M for the switch route.

It should be noted at this point that in a long stator linear motor, the position of each transport unit TEi, TEi+1 is known at all times, for example in a transport unit control 3, conveyor control 5 and/or segment control unit 4, so distances between two consecutively moving transport units TEi, TEi+1 can also be determined easily. The current positions are determined, for example, using position sensors along the conveyor line 2.

Of course, collision monitoring outside a switch W or outside a collision zone K, of course, can also be implemented by checking compliance with a predetermined minimum distance M between two transport units TEi, TEi+1 traveling in succession. The minimum distance M outside the switch W can be fixed, but can also be determined otherwise, as described below.

Even outside a switch W, the deflection of a transport unit TEi at a curved section, for example a curve, can reduce the distance between the transport unit TEi and a transport unit TEi+1 traveling behind it. However, the same situation also arises if the preceding transport unit TEi is moved on a straight section, but the transport unit TEi+1 traveling behind it is moved on a curved section. Here, too, the two transport units TEi, TEi+1 can come closer to one another alone on the curved section due to the deflection of the transport unit TEi+1, so that a collision may possibly not be avoided. However, even if the two transport units TEi, TEi+1 are both moved on a curved section, this situation may result that, as a result of the deflection of one (or both) transport unit TEi, TEi+1, there is an undesired approach of the two transport units TEi, TEi+1, for example, if the curvatures at the respective position of the transport units TEi, TEi+1 are not equal (which also includes the case of different signs of the curvatures). In this case, it may also be the case that the two transport units TEi, TEi+1 come closer by the deflection alone, so that a collision may possibly not be avoided.

In order to avoid a possible collision between the preceding transport unit TEi and a following transport unit TEi+1 in these situations outside a switch W, the minimum distance M to be maintained between the two transport units TEi, TEi+1 can be increased depending on the position to compensate for the deflection. Therefore, the minimum distance M between two consecutive moving transport units TEi. TEi+1 can be dependent on the position along the conveyor line 2. The minimum distance M thus changes dynamically in the operation of the conveyor 1. Thus, the minimum distance M to be maintained between two transport units TEi, TEi+1, which are both moved on a straight section, may be smaller than a minimum distance M to be maintained between two transport units TEi, TEi+1, wherein at least one of the two transport units TEi, TEi+1 is moved on a curved section.

It may naturally be the case that the minimum distance M can be dependent not only on the position of the two transport units TEi, TEi+1 along the conveyor line 2, but also on the dimensions (in particular length and width) of the transport units TEi, TEi+1. Transport units TEi, TEi+1 with different lengths and/or with different widths or shapes can naturally cause different deflections in curved sections, which can be taken into account in the minimum distance M to be maintained.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects.

Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. Method for operating a conveyor in the form of a long stator linear motor having a conveying path with at least one switch, with which a first conveyor section of the conveyor path is connected to a second conveyor section of the conveyor path and the first conveyor section and the second conveyor section diverge from a beginning of a switch in a region of the switch, the method comprising:

along the conveying path, a first transport unit and a second transport unit are moved and, to avoid collisions between the first transport unit and the second transport unit, a collision zone is set in the region of the switch, in which there is a risk of collision between the first transport unit and the second transport unit, wherein the collision zone extends from the beginning of the switch with a first length to a first end at the first conveyor section and extends from the beginning of the switch with a second length to a second end at the second conveyor section;

modeling the first transport unit on the first conveyor section and the second transport unit on the second conveyor section as two-dimensional objects;

at least one of selecting a two-dimensional geometric shape as a two-dimensional object for the first transport unit which surrounds a contour of the first transport unit or selecting a two-dimensional shape as a two-dimensional object for the second transport unit which surrounds a contour of the second transport unit;

with at least a part of the two-dimensional object modelling the first transport unit, determining a first position on the first conveyor section occupiable by the first transport unit, so that the second transport unit modeled as a two-dimensional object is movable along the second conveyor section collision-free through the switch; and determining a distance between the first position and the beginning of the switch, which is used as the first length.

2. The method according to claim 1, further comprising:
determining a second position of the second transport unit as a two-dimensional object on the second conveyor section that the second transport unit is allowed to occupy, so that the first transport unit as a two-dimensional object is movable along the first conveyor section collision-free through the switch; and determining a distance between the second position and the beginning of the switch, which is used as the second length.

3. The method according to claim 1, wherein the second length is set equal to the first length.

4. The method according to claim 1, wherein at least one of the first transport unit with a part conveyed by it or the second transport unit with part conveyed by it are modeled as two-dimensional objects.

5. The method according to claim 1, wherein, for different combinations of different first and second transport units, different collision zones are set for a switch.

6. The method according to claim 1, wherein for different switches, different collision zones are defined.

7. The method according to claim 1, wherein a second transport unit is allowed access to the collision zone on the second conveyor section in which the first transport unit is located, when a collision-free movement of the second transport unit into the collision zone is possible or a first transport unit is allowed access to the collision zone, in which the second transport unit is located, when collision-free movement of the first transport unit into the collision zone is possible.

8. The method according to claim 7, wherein a minimum distance between the first transport unit and the second transport unit is set, which must be complied with so that the first transport unit and the second transport unit are movable collision-free through the switch, and wherein to check compliance with the minimum distance, at least one of the first transport unit on the first conveyor section in the collision zone is projected onto the second conveyor section in the collision zone or the second transport unit on the second conveyor section the collision zone is projected onto the first conveyor section in the collision zone.

9. The method according to claim 8, wherein the minimum distance is determined at least one of depending on a geometry of the first or second conveyor section in the region of the switch or depending on a geometry of the switch.

10. The method according to claim 8, wherein, for different combinations of different first and second transport units, different minimum distances are set.

11. The method according to claim 1, wherein the beginning of the switch is a point at which the first conveyor section begins to diverge from the second conveyor section.

* * * * *